United States Patent
Franssson

[11] Patent Number: 5,924,141
[45] Date of Patent: Jul. 20, 1999

[54] COMBUSTION TOILET

[75] Inventor: Ivar Fransson, Mariestad, Sweden

[73] Assignee: R.J. Produkter AB, Sweden

[21] Appl. No.: 08/945,022

[22] PCT Filed: Dec. 21, 1995

[86] PCT No.: PCT/SE95/01564

§ 371 Date: Oct. 10, 1997

§ 102(e) Date: Oct. 10, 1997

[87] PCT Pub. No.: WO96/32047

PCT Pub. Date: Oct. 17, 1996

[30] Foreign Application Priority Data

Apr. 11, 1995 [SE] Sweden .................................. 9501360
Sep. 27, 1995 [SE] Sweden .................................. 9503346

[51] Int. Cl.$^6$ .................................................. A47K 11/02
[52] U.S. Cl. .................................................. 4/111.1
[58] Field of Search ................................ 4/111.1–111.5

[56] References Cited

U.S. PATENT DOCUMENTS 3,776,152  12/1973  Gill ........................................... 4/111.4
3,817,193  6/1974   Frankel et al. ............................ 4/111.4
4,148,103  4/1979   Nishioka .................................. 4/111.4

FOREIGN PATENT DOCUMENTS 5212807  2/1977  Japan .

Primary Examiner—Charles E. Phillips
Attorney, Agent, or Firm—Ostrolenk, Faber, Gerb & Soffen, LLP

[57] ABSTRACT

The invention relates to an incinerating toilet, having a basic structure (1) accommodating a preferably insulating block (5), which is rotatable in a horizontal plane, and provided with at least one recess (2, 2', 2") in its upper surface, this recess opening out in register with at least one opening (3), capped by a lidded seat ring (4), in the upper surface of the structure. The recess (2, 2', 2") accommodates an outer and an inner receptacle (6, 7) with a space (8) therebetween. An incinerating flame (9), or the like, and an air supply (10) are arranged via a sealing lid (11) over the recess when it is in a position rotated away from the place where the seat ring (4) is situated, this flame and air supply being together intended to incinerate waste deposited by the toilet user in the inner receptacle (7) simultaneously as the combustion gases occurring during incineration may be taken through the space (8), these gases dissipating more heat during their passage through the space for assisting in the vaporization of water and urine in the waste, before the gases reach atmosphere via an outlet (15).

9 Claims, 3 Drawing Sheets

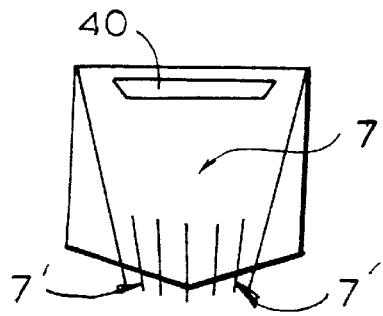
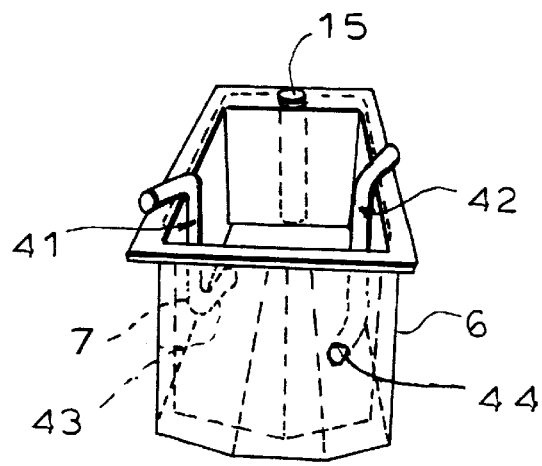
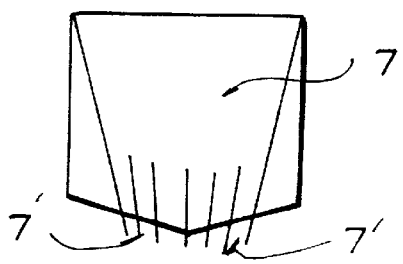
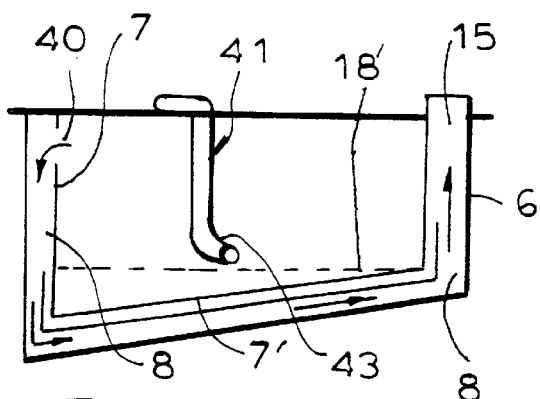
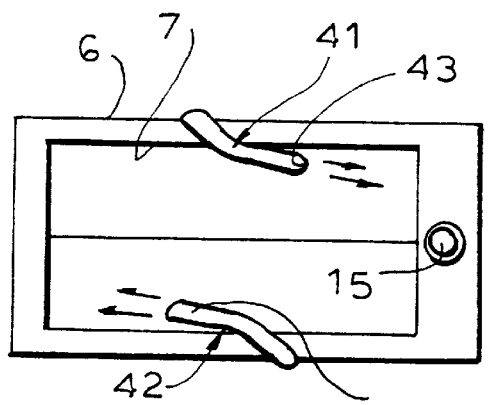
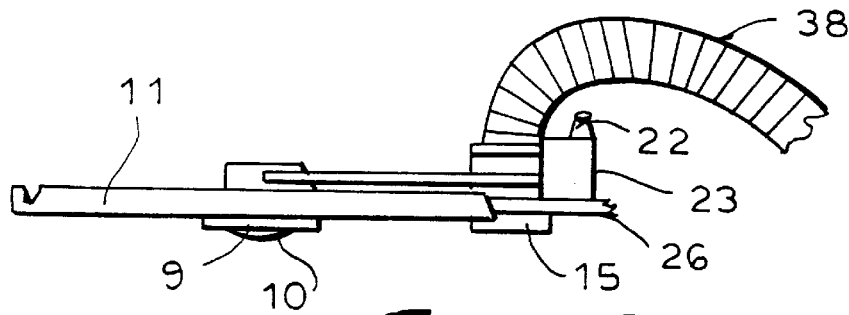

FIG. 10
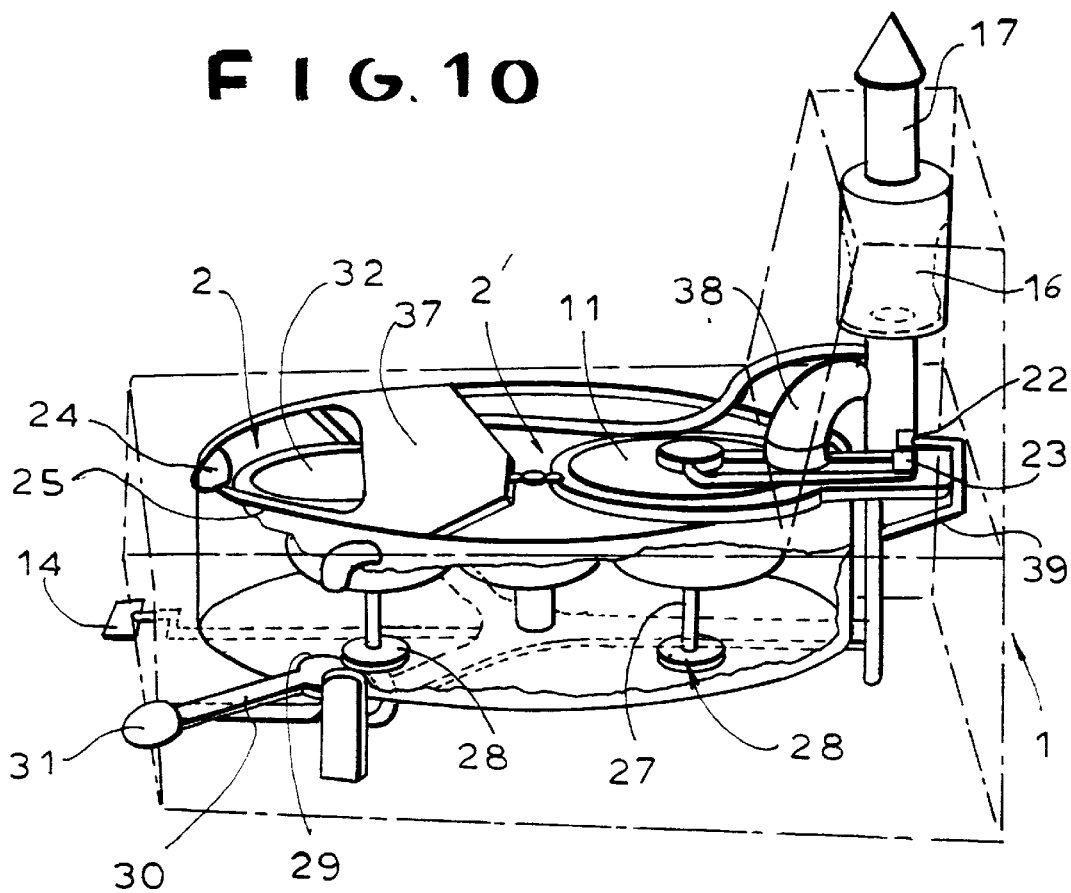
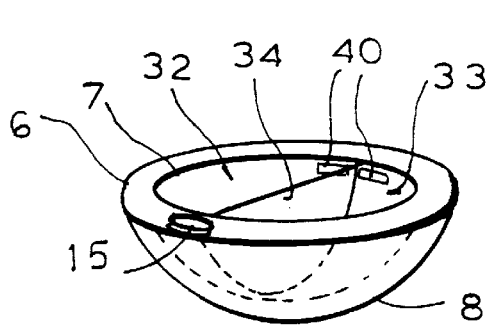
FIG. 11
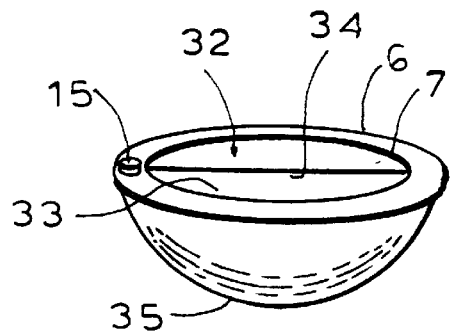
FIG. 12
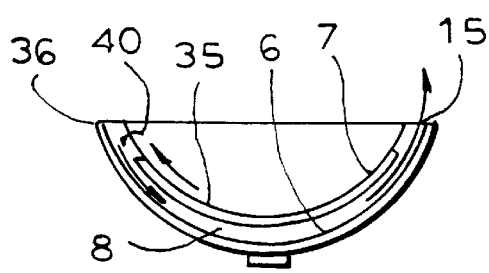
FIG. 13
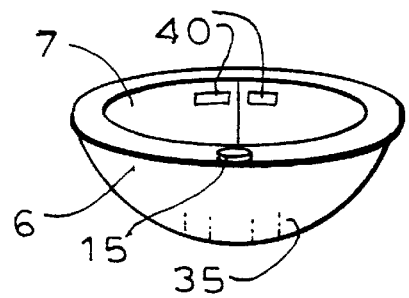
FIG. 14

COMBUSTION TOILET

The present invention relates to an incinerating toilet, which has a basic structure accommodating a preferably insulating block, which is rotatable in a horizontal plane, and provided with at least one recess in its upper surface, this recess opening out in register with at least one opening capped by a lidded seat ring, in the upper surface of the structure.

The object of the present invention is to provide an incinerating toilet of the kind mentioned above, that fullfils its purpose excellently, while being simple and cheap in production. The distinguishing features of the invention are disclosed in the accompanying claims.

Due to the invention, there has now been provided a toilet, in which waste incineration takes place separately from the place where the user performs his/her natural functions. LPG gas or oil fuel are preferred for combustion, the excess heat generated not being vented directly to atmosphere, but taken into a space between an inner and an outer receptacle, the former being intended for collecting waste and the latter being accommodated in the recess in the rotatable block, effective vaporization of water and/or urine thus being obtained. In previously known solutions this is the most difficult to vaporize and incinerate. Different types of shape and different numbers of receptacles, with or without partition walls, may be used here to afford rapid vaporization of water or urine, by having their bottom areas as large as possible. The capacity of the toilet, i.e. the number of visits it can cope with in a given time, may also be increased by using several receptacles. In addition, effectively improved waste incineration is achieved by supplying air through pipes in a direction towards the waste during combustion, this air causing the solid waste to be broken up, i.e. small cavities are formed in it, enabling the combustion flames not only to contact the solid waste constituents from above, but also such as to penetrate into it, thus providing both complete and rapid incineration thereof. Incineration time is also considerably shortened by combining the just-mentioned air supply with the provision of fins in the space between the receptacles.

The invention will now be described in more detail below, with the aid of a preferred embodiment and with reference to the accompanying drawings, where:

FIGS. 4–8 are different views of the inner and outer receptacles and the space therebetween, pipes for air supply to the inner receptacle also being shown in FIGS. 6–8.

FIG. 9 is a view of a lid for use with the receptacles, when one of them is at the combustion station.

FIG. 10 is a similar view to the one in FIG. 1, but shows an alternative embodiment where there are two pairs of inner and outer receptacles, each inner receptacle being rotatable in relation to the block, and provided with at least two compartments, and FIGS. 11–14 illustrate the receptacle configurations used in the embodiment example illustrated in FIG. 10.

Figure 1:
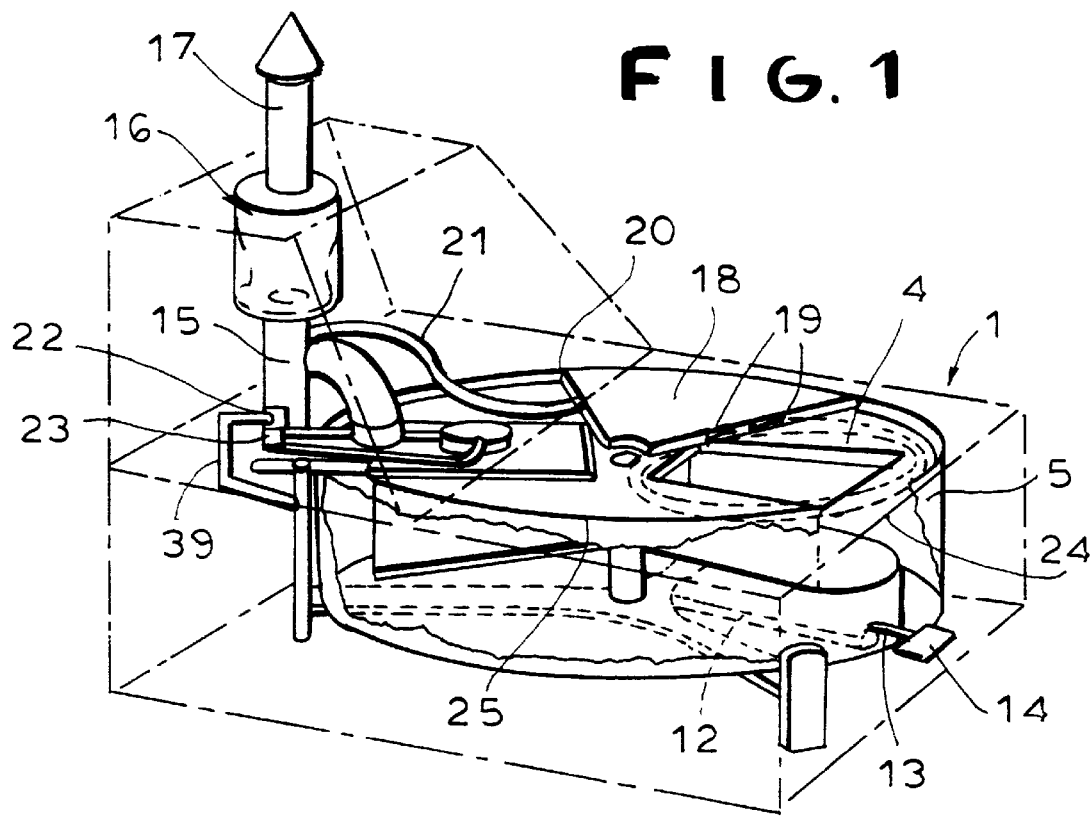
FIG. 1 is a schematic, perspective view, partly in section, of an incinerating toilet in accordance with the invention, which includes a substructure accommodating a block of insulating material provided with recesses, the block being rotatable such that the recesses can come to given stations for use, incineration and possible cooling.
Figure 2:
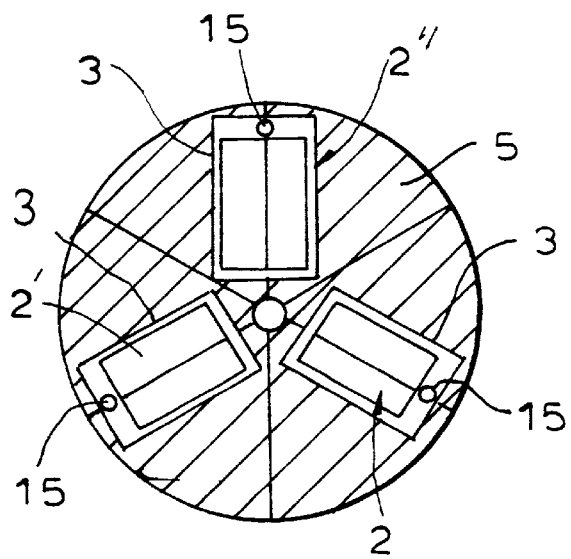
FIG. 2 is a view from above of the block and its recesses, the block being provided with an insulating material.
Figure 3:
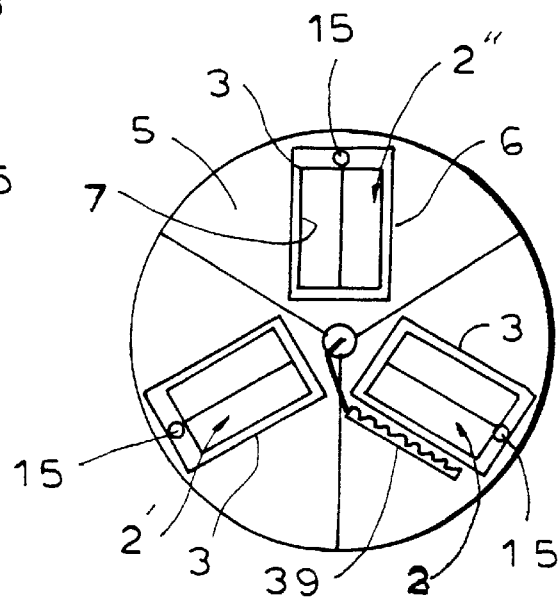
FIG. 3 is a similar view of the block, without insulation, a scraper blade for removal of paper or other matter also being shown, the blade being adapted for attachment to the central shaft of the block.

As will be particularly apparent from FIG. 1, the incinerating toilet includes a basic structure 1, which accommodates an insulating block 5, rotatable in a horizontal plane, and provided with at least one recess 2, 2', 2" in its upper surface, this recess opening out in register with an opening 3, capped by a lidded seat ring 4, made in the upper surface of the structure 1.

In each recess 2, 2', 2" there is an inner receptacle 7 with a space 8 between it and an outer receptacle 6. In one embodiment example of the invention (unillustrated on the drawings) the inner receptacle 7 may include at least two mutually partitioned compartments. A flame from a jet 9, supplied with LPG gas or fuel oil, and an air supply 10 are disposed on a separate, raisable lid 11 situated above the appropriate recess 2, 2', 2", now placed at the incinerating station. There are means 12, 13 for rotating the block 5, and also such as a foot pedal and catch, which may be operated at predetermined, suitable occasions, depending on the incineration process.

At the incinerating station, the flame from the jet 9 together with supply air 10 are intended totally to incinerate the waste deposited in the inner receptacle 7 after a visit to the toilet, while the flue gases thus generated are taken through the space 8 via a vent 40. During their passage through the space 8 the gases surrender heat to the inner receptacle 7 for aiding vaporization of water and/or urine in the deposited waste, before they are taken to atmosphere via an outlet 15, filter 16 and flue pipe 17. To facilitate incineration the receptacle 7 may be provided with a grating 18' for separating solid and liquid waste. As will be seen from FIGS. 4–8, the receptacle is provided with fins 7' on its surface facing space 8, as well as pipes 41 and 42 for supplying outside air to the receptacle via outlets 43, 44, which are adjustable to different angular attitudes for obtaining the best, desired result. During incineration the fins 7' contribute to heating the receptacle as they take up heat from the flue gases, as these gases pass through space 8 via vent 40 on their way to outlet 15. Even more effective incineration may be obtained by blowing air through pipes 41 and 42 towards the waste. Likewise, after termination of incineration the fins act for cooling as air blown from pipes 41 and 42 passes over them, continuing to do so for a given time after incineration.

The inventive toilet functions in the following manner. After using the toilet, the user lowers the lid on the seat and activates a push button (unillustrated on the drawings). The block 5 is thus caused to rotate with its recesses 2, 2', 2" and the receptacles therein. When the receptacle 7 with its newly deposited waste comes into position at the incinerating station, an insulated lid 11 is lowered over it. Flames from the jet 9 and air from supply 10 are now directed towards the contents of receptacle 7 for incinerating the solid waste and causing water and/or urine to evaporate, assisted by flue gases taken through the space 8 via vent 40. After a given time, when all the waste has been incinerated and water and/or urine have evaporated, air supply 10 and fuel to the jet 9 are cut off automatically. The receptacle 7, after optional removal of ashes and optional cooling, may then be transferred by the block 5 to the station for deposition. The block may of course be operated automatically also, with the aid of timing equipment not shown here.

With regard to the embodiment illustrated in FIG. 1 it may be mentioned that three recesses 2, 2', 2" are used here, each containing an inner and outer receptacle. They are operated such that when recess 2 and its receptacles are at the use or deposition station, the recess 2' is at the incinerating station with the lid 11 lowered for tightly sealing against the receptacles 6, 7, the inner one 7 being the one in which incineration takes place, as will be more easily seen in FIGS. 4–8. Receptacle 7 is formed to serve as an insert, and is shown in more detail in FIGS. 4–5. Although not shown on the drawing the receptacle 7 may be sub-divided into two or more separate compartments. The third recess 2" and its receptacles are at the cooling station, under a ventilation plate 18, which is provided with ducts and orifices 19 for supply air and 20 for exhaust air/ventilation. A hose 21 takes the exhaust air to the outlet 15. After the use station, in the rotational direction of block 5, there is a scraper blade 39 for pushing erroneously deposited waste or the like back into receptacle 7.

The sealing lid 11, shown in more detail in FIG. 9, includes, inter alia, a hinge 26 pivotally joining it to the substructure 1. Incineration can only take place when the lid is completely closed, and this is ensured with the aid of a small recess 24 made in the upper edge 25 of the block 5 for each receptacle pair. This recess assists in actuating initiation and termination of incineration. When a recess and its receptacles come into position at the incineration station the lid 11 is closed over them, thus allowing a lug 22, mounted on an ignition device 23, in turn mounted on the lid 11, to be acted on via a linkage system 39 as the lid is sealed against the receptacles, resulting in that the device 23 ignites the incineration flame.

In a further embodiment, illustrated in FIG. 10, the rotating block 5 of the incinerating toilet is provided with two recesses 2, 2' accommodating receptacles 6, 7, of which the latter is rotatable in the block itself. Rotation of the block and operation of the lid 11 take place in the same way as with the previously mentioned embodiment. The greatest difference here is that the receptacles 6, 7 may be rotatable together in their respective recesses 2, 2'. This rotation is performed with the aid of gear wheels 28 mounted on vertical shafts 27 and operated by a gear segment 29 attached to an operating lever 30. The lever 30 is provided with a knob 31 to facilitate its operation. The receptacles used in this embodiment are shown in more detail in FIGS. 11–14, where it will be seen that the inner receptacle 7 has two compartments 32 and 33, separated by partition wall 34. The inner receptacle 7, or so-called collection cup, is arranged in receptacle 6 and rotates in it with the aid of an advancing means together with means 27–31. Receptacle 7 is provided with heat energy dissipation fins 35 accommodated in the space 8. The outlet 15 is connected to atmosphere via filter 16 and flue pipe 17. With this embodiment also, air supply pipes similar to those in FIGS. 6 and 8 may be arranged in receptacle 7 to make incineration more effective. A slide ring/sealing ring 36, e.g. made from teflon, is provided at the edge portions of the receptacles 6 and 7, for reducing friction between them when receptacle 6 is rotated.

In the case where the inner receptacle has two compartments 32, 33, either one or other of them is rotated into a position apparent from FIG. 10. The other compartment will then be covered by a plate 37. In this embodiment, the lid at the incineration station has, of course, a round shape corresponding to that of the receptacles. A flexible hose 38 is used to take exhaust air to the flue pipe 17.

The incineration toilet in accordance with the embodiment illustrated in FIG. 10 functions in the following manner. One of the two recesses 2, 2' are either in a forward or rear position. The recess in the forward position has, for example, its receptacle 7 turned so that compartment 32 will be used, the other one 33 being under the cover plate 37. After deposition of waste, the receptacle 7 is rotated by actuating knob 31, such that compartment 32 comes under cover plate 37. When a deposition has been made in compartment 33, the block 5 is rotated 180°, so that the used compartments 32, 33 assume the incineration position. After waste incineration, the recess 2 with its receptacles can be returned to the use station when both compartments 32 and 33 in the receptacle 7 already there have been used. The utilization cycle is then repeated as required.

I claim:

1. An incinerating toilet, comprising:

a housing having an upper surface and a housing opening in the upper surface;

an outer receptacle disposed in the housing, the outer receptacle having a first receiving chamber and an outer receptacle opening providing access into the first receiving chamber, the outer receptacle opening is placed in register with the housing opening to receive waste;

an inner receptacle having a second receiving chamber and an inner receptacle opening providing access into the second receiving chamber, the inner receptacle is disposed in the first receiving chamber such that waste deposited through the housing opening is deposited into the second receiving chamber through the inner receptacle opening, the inner receptacle being disposed in the outer receptacle but spaced apart therefrom to define a space therebetween, the inner receptacle including a vent to permit gas to flow from the second receiving chamber into the space between the inner and outer receptacles;

a sealing member disposed on the upper surface of the housing for sealing the second receiving chamber after the deposit of waste therein so that the waste can be incinerated, the sealing member including an incinerating element and an air supply element supported on a surface thereof facing the second receiving chamber for supplying incineration gases toward the waste to be incinerated; and a plurality of heat absorbing fins disposed in the space between the inner and outer receptacles, the fins extending in a direction of flow of flue gases from the second receiving chamber and through the vent and through the space, wherein the plurality of fins facilitate heating of the inner receptacle by absorbing heat from the flue gases passing therethrough.

2. The incinerating toilet according to claim 1, further comprising an outlet conduit extending from the outer receptacle and in fluid communication with the space between the inner and outer receptacles, and wherein the plurality of fins extend from the vent to the outlet conduit.

3. The incinerating toilet according to claim 1, wherein the inner receptacle further comprises at least one air supply pipe mounted thereto, the air supply pipe having an outlet directed into the second receiving chamber for directing an air flow toward the waste to be incinerated, and wherein each air supply pipe is mounted to the inner receptacle via means for adjusting a direction of air flow through the outlet into the inner receptacle.

4. The incinerating toilet according to claim 1, comprising at least two sets each comprising one of the outer receptacles and a corresponding one of the inner receptacles disposed in the outer receptacle, and the at least two sets of outer and inner receptacles are exchangeably disposed in the housing and with respect to the incinerating element such that while waste in one inner receptacle is being incinerated, another inner receptacle is available for deposit of waste therein.

5. The incinerating toilet according to claim 4, wherein the sets of outer and inner receptacles are revolvably mounted in the housing to revolve between the location where waste is to be deposited and another location at the incinerating element.

6. The incinerating toilet according to claim 1, wherein the inner receptacle is divided into at least two mutually separate compartments, so that when one compartment is at the incinerating element, another compartment is available for deposit of waste.

7. The incinerating toilet according to claim 6, wherein the divided inner receptacle is rotatably mounted in the outer receptacle around an axis of the divided inner receptacle so that each separate compartment is rotatable between the location where waste is to be deposited and a location at the incinerating element.

8. The incinerating toilet according to claim 1, wherein the sealing member further includes a switch mounted thereon for activating the incinerating element to actuate an incineration process when the sealing member is sealed over the second receiving chamber and for deactivating the incinerating element to terminate the incinerating process when the sealing member is not sealed over the second receiving chamber.

9. The incinerating toilet according to claim 1, wherein the inner and outer receptacles each have a hemispherical shape.

* * * * *